United States Patent [19]

Stoffel

[11] Patent Number: 4,536,077
[45] Date of Patent: Aug. 20, 1985

[54] MULTI-MODE SCANNER

[75] Inventor: James C. Stoffel, Rochester, N.Y.

[73] Assignee: Xerox Corporation, Stamford, Conn.

[21] Appl. No.: 489,982

[22] Filed: Apr. 29, 1983

[51] Int. Cl.³ .......................................... G03G 15/00
[52] U.S. Cl. ..................................... 355/8; 355/3 R; 355/14 SH; 355/24
[58] Field of Search ................ 355/3 R, 14 R, 8, 23, 355/25, 11, 24; 358/293, 285, 289

[56] References Cited

U.S. PATENT DOCUMENTS

| | | | |
|---|---|---|---|
| 3,844,654 | 10/1974 | Guenther | 355/24 |
| 3,980,406 | 9/1976 | Lang | 355/24 |
| 3,998,543 | 12/1976 | Wick et al. | 355/24 |
| 4,035,073 | 7/1977 | Del Vecchio | 355/24 |
| 4,261,661 | 4/1981 | Thiers | 355/24 |
| 4,429,333 | 1/1984 | Davis et al. | 358/293 |

Primary Examiner—A. C. Prescott
Attorney, Agent, or Firm—Frederick E. McMullen

[57] ABSTRACT

A multi-mode scanner having a first automatic simplex scan mode, a second automatic duplex scan mode, and a third manual simplex scan mode, the scanner including a pair of scan stations for scanning opposing sides of a document, automatic document feeder means for separating a document to be scanned from a document supply and transporting the document to the first one of the scan stations where one side of the document is scanned in the first mode, and thereafter inverting the document and transporting the inverted document to the second one of the scan stations where the opposite side of the document is scanned in the second mode; a platen for manually accepting a document to be scanned in the third mode, and a movable scan carriage positionable in accordance with the mode selected having presettable optics to convey image rays from either the first or second scan station or from the platen to a scanning array.

9 Claims, 5 Drawing Figures

MULTI-MODE SCANNER

The invention relates to a raster scanner, and more particularly, to a multiple mode raster scanner.

In raster scanners, versatility in the sense of the ability of the scanner to process documents in a variety of easily programmed ways is highly desirable. For as will be understood, in some cases a simple manual scan operation is desirable such as is often forced on the user or operator when processing overlarge documents, or where the document is particularly unique as in the case of paste-ups, or very valuable, etc. On the other hand, it is also desirable to provide fully automatic operation where the operator or user is simply required to insert the documents to be scanned into the scanner, select the type of scan process desired, push a start button, and walk away confident in the ability of the scanner to complete the process selected.

The present invention seeks to provide the aforementioned features, the invention providing a multi-mode raster scanner having a first simplex mode wherein one side of a document is scanned automatically, a second duplex mode wherein the opposite side of the document is automatically scanned in addition, and a third manual simplex mode wherein one side of a document is scanned, comprising: a first scan station for scanning one side of the document in the first mode; a second scan station for scanning the opposite side of the document in the second mode; a platen for supporting a document to be scanned in the third mode; means forming a document path for conducting a document to be path including means to invert the document before the document reaches the second scan station; document transport means for moving documents along the document path; the first and second scan stations each including a scanning slit through which the document is scanned; at least one scanning array; optical means for transmitting document images from the first and second scan stations and the platen to the array; and carriage means supporting the array and the optical means for selective movement into scanning relation with the first and second scan stations in the first and second modes or for scanning movement past the platen in the third mode.

IN THE DRAWINGS

Figure 1:
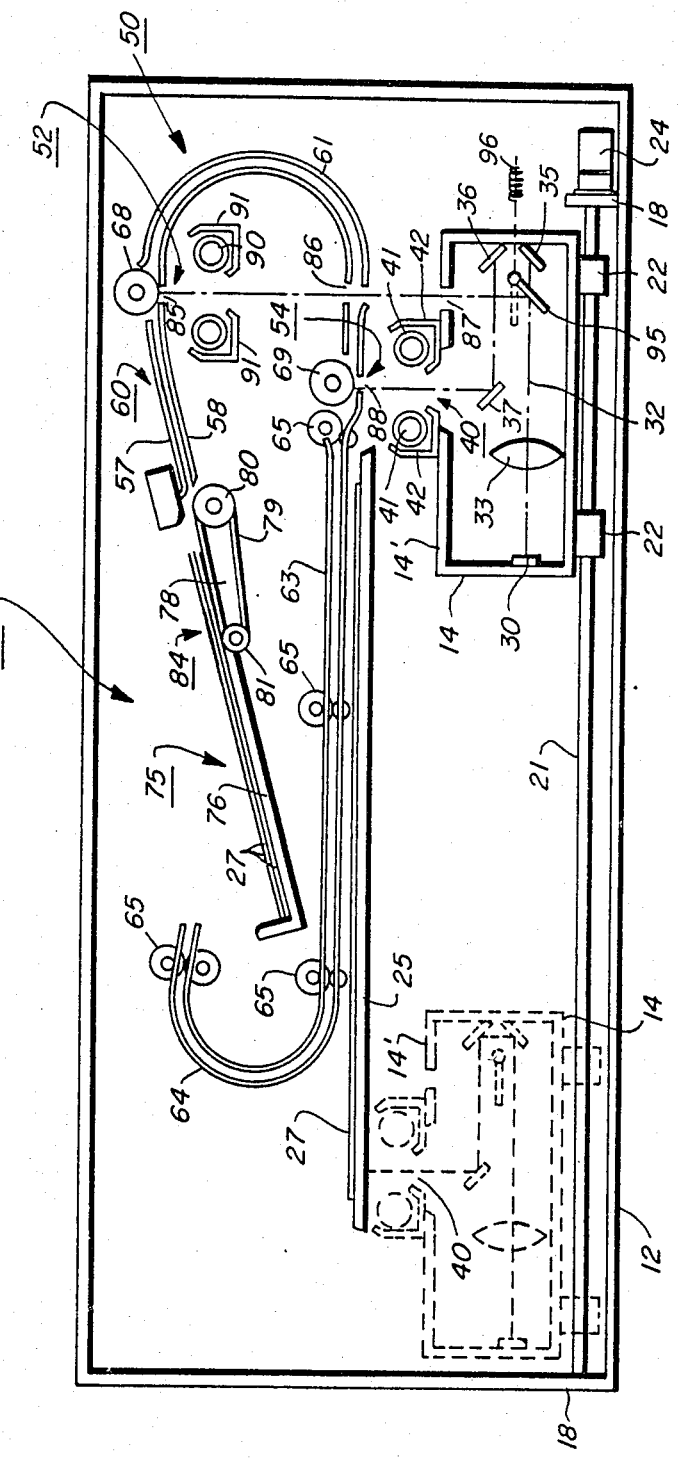
FIG. 1 is a schematic side view showing details of the multi-mode scanner of the present invention.

Referring to the drawings, the multi-mode document scanner of the present invention, designated generally by the numeral 10, is there shown. As will appear, scanner 10 is operative in a first or automatic simplex scan mode (MODE I) to scan one side of a document, in a second or automatic duplex scan mode (MODE II) to additionally scan the reverse or opposite side of the document, and in a third or manual simplex scan mode (MODE III) to scan one side of a manually located stationary document.

Figure 2:
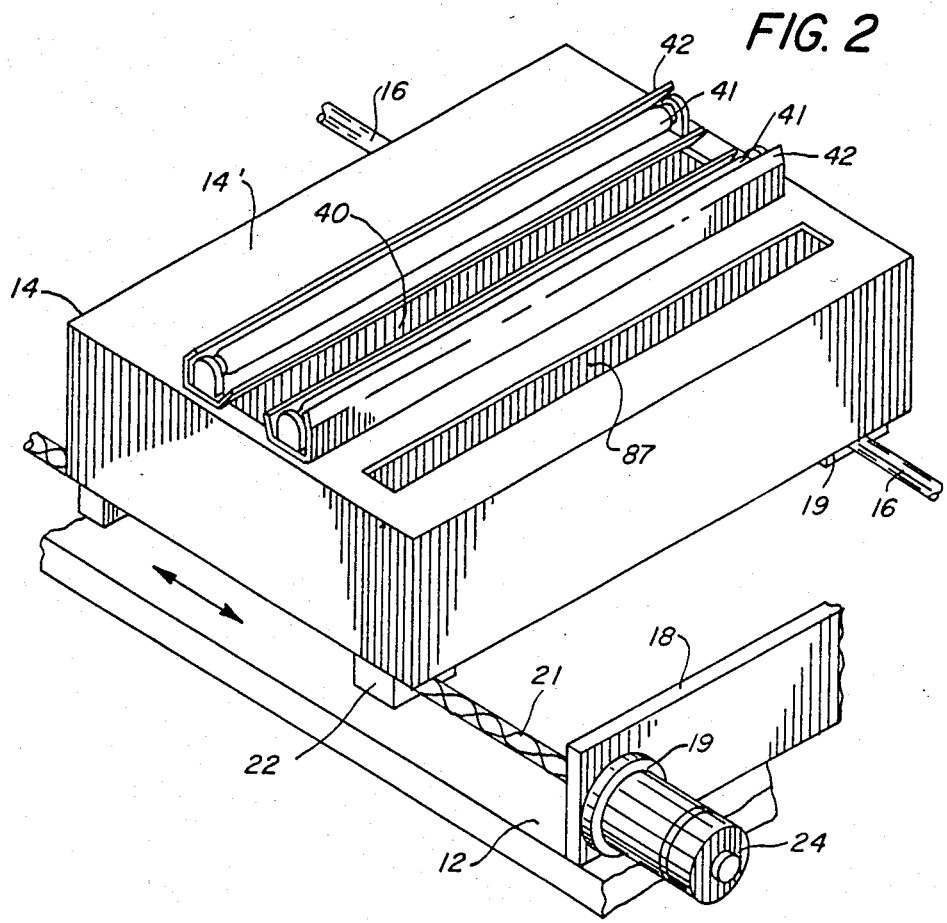
FIG. 2 is an enlarged isometric view of the scan carriage of the scanner shown in FIG. 1.

Scanner 10 includes a suitable frame 12 within which is mounted a reciprocable carriage 14. Carriage 14 is supported by means of a stationary longitudinally extending rod 16 (seen in FIG. 2) on one side and a longitudinally extending drive screw 21 on the other side. Both rod 16 and screw 21 are mounted in upstanding frame elements 18 of frame 12. Suitable bearing means 19 are provided for slidably supporting carriage 14 on rod 16 and for rotatably mounting screw 21 in frame elements 18. To effect reciprocatory scanning motion of carriage 14, screw 21 is threadedly received in nuts 22 fixed to the underside of carriage 14. A suitable motor 24 is provided for rotating screw 21 to move carriage 14 back and forth in the direction shown by the solid line arrow.

A transparent platen 25 is provided on frame 12 above and in predetermined spaced relation to carriage 14 such that carriage 14, upon actuation of drive motor 24, moves, i.e. scans, under the platen 25 and the document 27 thereon when scanner 10 is operated in the third mode as will appear.

For scanning purposes, one or more linear scanning arrays 30 are supported on carriage 14 adjacent one end thereof. An optical system 32 having imaging lens 33 and cooperating right angle mirrors 35, 36, 37 focuses a line-like portion of platen 25 thereabove onto array 30, the upper surface 14' of carriage 14 having a scan slit 40 therein to permit image rays from the document 27 being scanned on platen 25 to pass therethrough. Exposure lamps 41, each with a cooperating reflector 42, are mounted on surface 14' of carriage 14 on each side of scan slit 40 to illuminate a line like portion of platen 25 and the document 27 thereon. A suitable scan lamp power supply 44 (shown in FIG. 5) is provided for energizing lamps 41. As will appear, when scanner 10 is operated in the third mode, motor 24 is energized to drive carriage 14 past platen 25 and scan the document 27 thereon with lamps 41 energized to illuminate platen 25 and the document thereon.

Scanning array 30 may comprise any suitable commercially available linear array. While a single array 30 is illustrated, it will be understood that plural arrays which may be either optically or electronically abutted or overlapped may be used. A suitable clock 31 (shown in FIG. 5) is provided for driving array 30.

Figure 4:
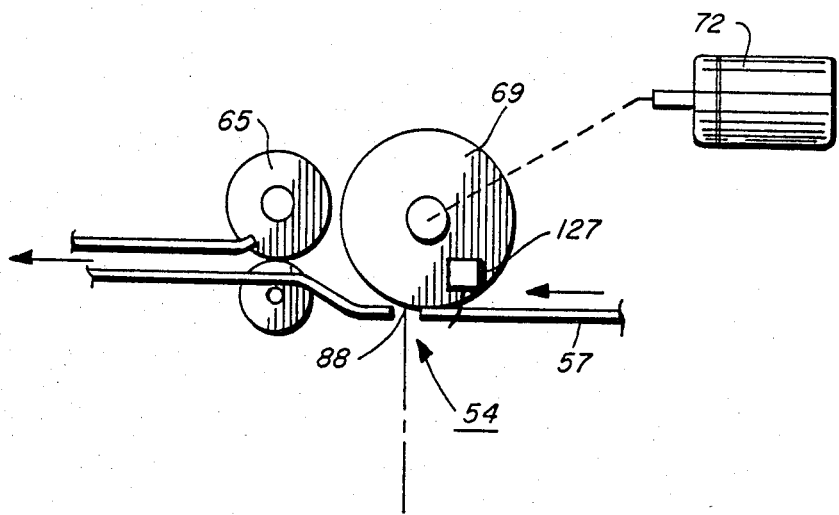
FIG. 4 is an enlarged side view in section showing details of the second or duplex scan station for the scanner of FIG. 1.
Figure 3:
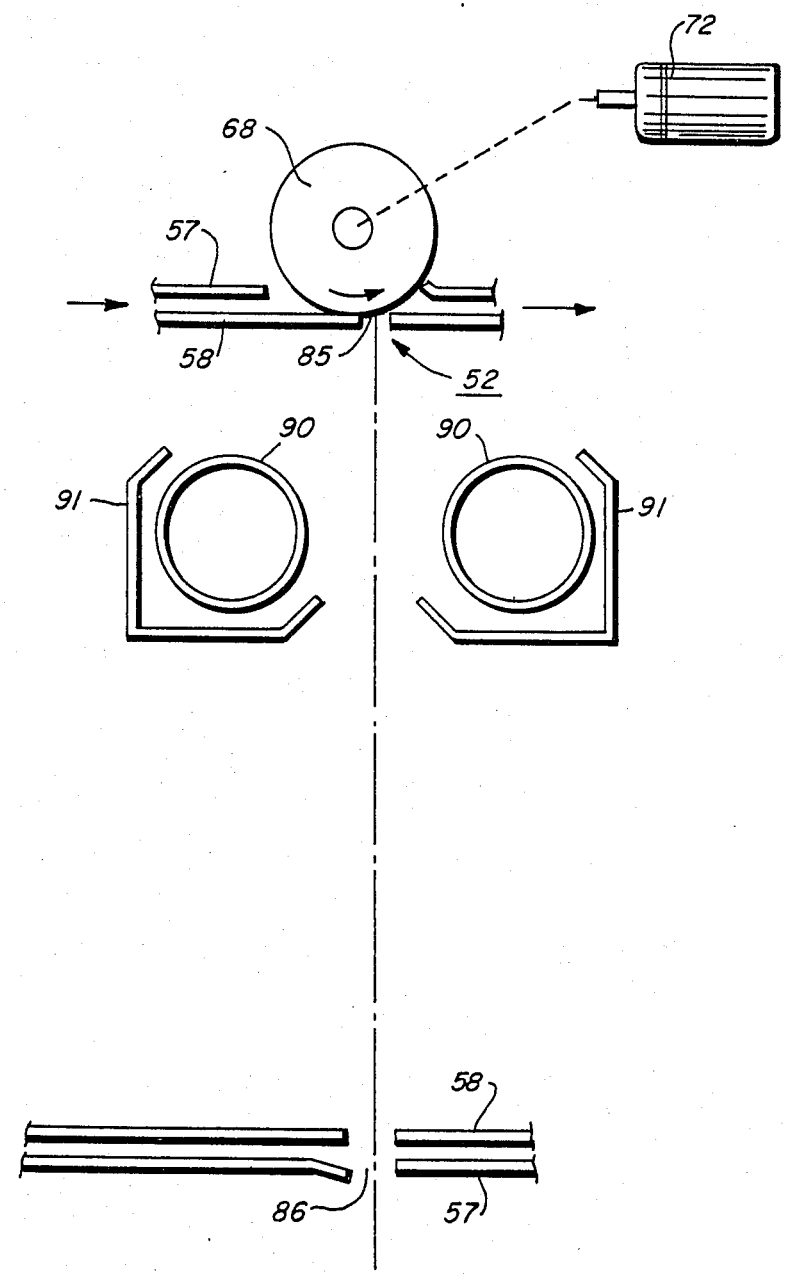
FIG. 3 is an enlarged side view in section showing details of the first or simplex scan station for the scanner of FIG. 1.

For automatic operation in either or both of the first and second modes, a document scan path 50 is provided for guiding the document 27 being scanned past a pair of scan stations 52, 54 in succession. As seen in FIG. 1, scan path 50 is formed from spaced upper and lower guides 57, 58 suitably supported by frame 12 above platen 25. Conveniently, document scan path 50 may be broken down into a first slightly uphill document inlet section 60 leading to the first or upper scan station 52 followed by a generally U-shaped inverting section 61 leading to the second or lower scan station 54. A generally horizontal return section 63 downstream of scan station 54 leads to a second generally U-shaped inverting section 64, the latter serving to once again invert the document prior to discharge from the document scan path. A plurality of cooperating pinch roll pairs 65, which are rotatably journaled in frame 12, are provided at discrete spaced positions along the document scan path 50 to transport the document being scanned therealong. Additionally, as seen in FIGS. 1, 3 and 4, a constant velocity transport (i.e., CVT) roll 68, 69 is provided at each of the scan stations 52, 54 to provide controlled movement of the document being scanned through scan station 52, 54, CVT rolls 68, 69 forming in cooperation with the portion of the lower and upper guides 58, 57 respectively opposite thereto a nip for feeding the document through scan stations 52, 54 at a controlled rate. CVT rolls 68, 69 are suitably journaled in frame 12. A document sensor 127 (seen in FIG. 4) is disposed slightly upstream of the nip formed by CVT roll 69 with the portion of upper guide 57 opposite thereto to detect the arrival of the document being scanned at scan station 54.

Figure 5:
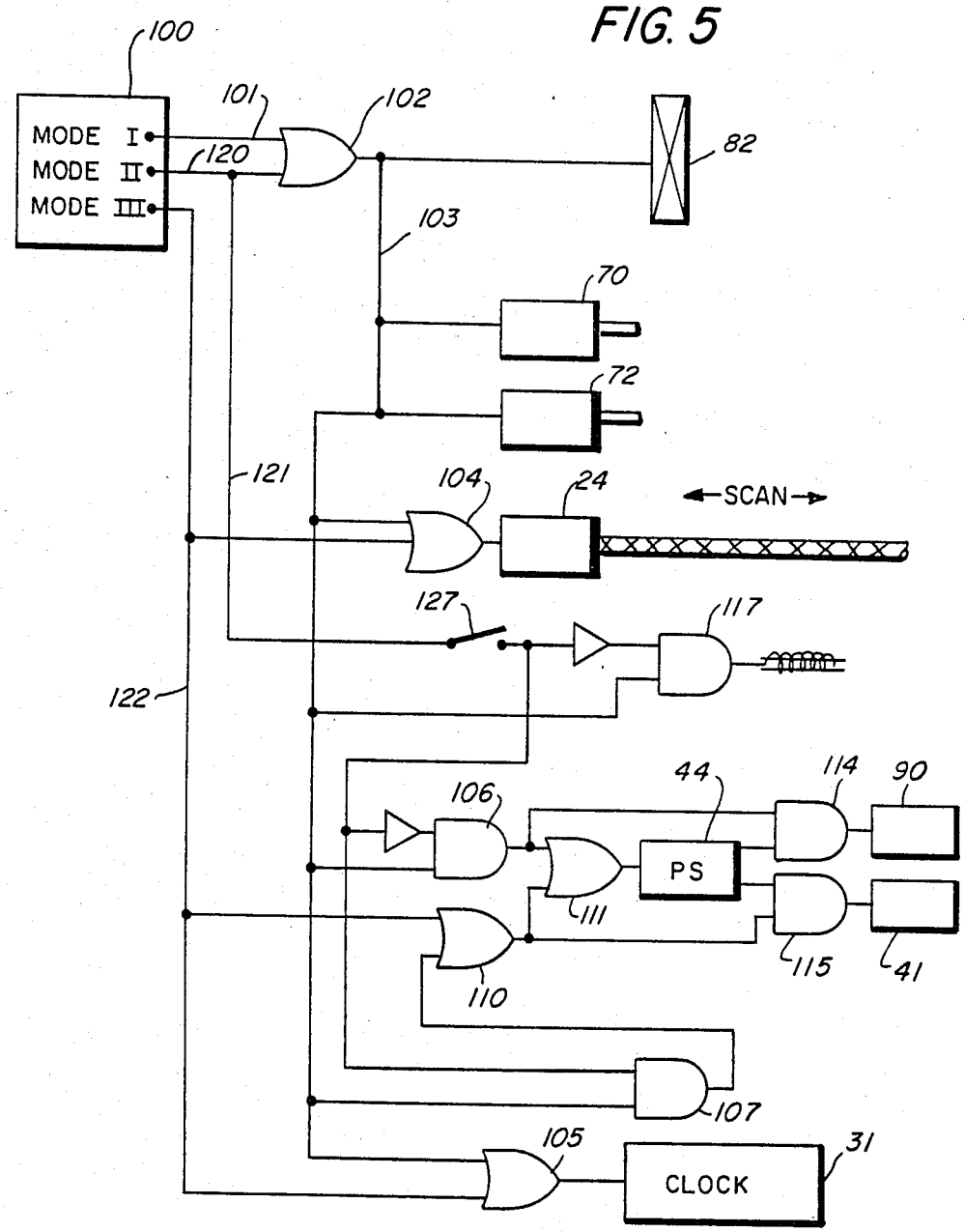
FIG. 5 is a logic schematic of the control circuit for the scanner shown in FIG. 1.

Pinch roll pair 65 are drivingly coupled to a suitable drive motor 70 (seen in FIG. 5) while CVT rolls 68, 69 are drivingly coupled to a step type motor 72 (seen in FIGS. 3, 4 and 5).

A document supply tray 75 is mounted on frame 12 in operative relation between the inlet and outlet sections 60, 64 respectively of document scan path 50, document supply tray 75 having a base 76 on which a supply of documents 27 to be scanned may be disposed when it is desired to operate scanner 10 in either the first or second scanning modes. A document feeder 78 comprising a document feed belt 79 trained about drive and idler rolls 80, 81 is provided. Drive and idler rolls 80, 81 are rotatably supported in-frame 12 below the forward or discharge end of tray base 76, base 76 having a suitable aperture 84 to permit the document feed belt 79 to drivingly contact the bottommost document on base 76 of document supply tray 75. Drive roll 80 of document feeder 78 is driven by motor 70 through selective engagement of a clutch 82 (seen in FIG. 5). As will be understood, document supply tray 75 has suitable stops and guides (not shown) to retain the documents 27 placed therein in desired position.

Referring particularly to FIGS. 1 and 3 of the drawings, to accommodate scanning of a document as the document is transported along the document scan path 50, a pair of axially aligned scan slits 85, 86 are provided in the upper and lower sections 60, 63 of path 50 opposite scan station 52. A cooperating scan slit 87 is provided in the upper surface 14' of carriage 14, scan slits 85, 86, 87 cooperating on disposition of carriage 14 in the solid line position shown in FIG. 1 to form a path for image rays from scan station 52 to the optical system 32 as will appear. As seen in FIG. 4, a similar scan slit 88 is provided in the lower section 63 of document scan path 50 opposite scan station 54, scan slit 88 cooperating with scan slip 40 in the upper surface 14' of carriage 14 to form a path for image rays from scan station 54 to the optical system 32 when scan carriage 14 is in the solid line position shown in FIG. 1 of the drawings. A pair of illumination lamps 90, each with cooperating reflectors 91, are suitably supported on frame 12 below scan station 52 to illuminate scan slit 85 and the portion of the document in document scan path 50 opposite thereto. Lamps 90 are energized from power supply 44 as will appear.

Optical system 32 includes a movable mirror 95 selectively interposable into the optical path when operating in the first mode, mirror 95 being rotatably supported on carriage 14 by suitable means (not shown). A driver, illustrated here in the form of solenoid 96, is provided for moving mirror 95 to the solid line position of FIG. 1 when scanning in the first mode. Suitable spring means (not shown) is provided to return mirror 95 to the dotted line position shown following deenergization of solenoid 96 (seen in FIG. 5). Suitable stops (not shown) may be provided to control the degree of movement of mirror 95 between the solid line and dotted line positions shown.

Referring now to FIG. 5, a suitable controller 100 is provided to enable the user or operator to control scanner 10 and select the operating mode desired. For operation in the first or automatic simplex mode (MODE I), the control signal output of controller 100 passes through OR function gate 102 to distributor line 103. From line 103, the control signals control through OR function gates 104, 105 operation of carriage drive motor 24 and clock 31 of array 30. Additionally, the control signals work through AND function gates 106, 107, OR function gates 110, 111, and AND function gates 114, 115 to control energization of lamp power supply 44 and selection of scan lamp pair 41 or 90. The control signals in line 103 further control through AND function gate 117 operation of solenoid 96 as well as operation of pinch roll drive motor 70, step motor 72, and document feeder clutch 82.

For operation in the second or automatic duplex scan mode (MODE II), the control signal output of controller 100 passes through line 120 and gate 102 to distributor line 103, the signals from line 103 being distributed to the printer components as described above. Additionally, a signal enabling document sensor 127 is output through line 121.

For operation in the third or manual scan mode (MODE III), the control signal output of controller 100 passes to a distributor line 122 which distributes the control signals to gates 104, 105, 110 to operate carriage drive motor 24, clock 31 of scanning array 30, and scan lamps 41.

OPERATION

When it is desired to operate scanner 10 in the first or automatic simplex scan mode (MODE I), the document or documents 27 to be scanned are placed in document supply tray 75 and controller 100 is set for MODE I. The control signal output of controller 100 to distributor line 103 actuates carriage drive motor 24 to move scan carriage 14 to the solid line position shown in FIG. 1 and solenoid 96 is energized through gate 117 to place mirror 95 in the solid line position shown in FIG. 1. Additionally clock 31 is actuated to operate the array or arrays 31 and lamp power supply 44 is actuated (through gates 106, 111) to energize scan lamps 90 (through gate 114).

The control signal output of controller 100 also actuates motor 70 to drive pinch roll pairs 65 and step motor 72 to drive CVT rolls 68, 69 of scan stations 52, 54 respectively. Document feeder clutch 82 is temporarily actuated to operate document feeder 78 for an interval sufficient to enable document feed belt 79 to advance the bottommost document in tray 75 into inlet section 60 of document scan path 50 and bring the document leading edge into driving relation with CVT roll 68.

CVT roll 68 steps the document 27 across scan slit 85 where the line-like portion of the document opposite slip 85 and illuminated by scan lamps 90 is scanned by array 30. The image rays from the document pass through scan slits 85, 86, 87 to mirror 95 and from mirror 95 to imaging lens 33 and array 30.

CVT roll 68 carries the document along the document scan path 50 and through inverting section 61 to the second scan station 54 and CVT roll 69 thereof. Scan station 54 is inoperative in this mode. CVT roll 69 thereof, which is driven in unison with CVT roll 68 by step motor 72, cooperates with the adjoining pinch roll pair 65 to carry the document past scan station 54 and through return section 63 into inverting section 64 of document scan path 50. There the document is inverted to a face up position and discharged from the document scan path 50 onto the topmost document in document supply tray 75.

Where operation in the second or automatic duplex scan mode is desired (MODE II), controller 100 is set to MODE II second operating position. In this mode, scanner 10 scans both sides of the document as the document is carried along the document scan path 50 and past scan stations 52, 54 in succession. In this mode, the control signal output of controller 100 to distributor line 103 operates the various scanner components in the same manner as described above in connection with MODE I. Additionally, the signal output of controller 100 to line 107 enables document sensor 127 controlling operation of the second scan station 54 as will appear.

As described in connection with MODE I, the bottommost document 27 in document supply tray 75 is fed into the document scan path 50 by document feeder 78 and carried past the first scan station 52 by CVT roll 68 where the bottom or first side of the document is scanned line by line by array 30. As the document leaves scan station 52 and moves into inverting section 61 of document scan path 50, the document is inverted so that what was previously the top side of the document is now the bottom side, and vice versa. As the leading edge of the now-inverted document enters the nip formed by CVT roll 69 and the portion of the document guide 57 opposite thereto at scan station 54, sensor 127 is actuated in response to the document leading edge. The signal output of sensor 127 disables gates 106, 117 and triggers gate 107. Gate 107 retains scan lamp power supply 44 in operation and actuates (through gates 110, 115) the scan lamps 41. Disabling of gate 106 deenergizes scan lamps 90 while disabling of gate 117 deenergizes solenoid 96. With solenoid 96 deenergized, mirror 95 returns to the dotted line position shown in FIG. 1 and out of the optical path.

As the now-inverted document 27 is carried through scan station 54 by CVT roll 69, the document is scanned line by line by array 30. The image rays from the document pass through scan slits 88, 40 to mirror 37, and from mirror 37 to mirrors 36, 35, and imaging lens 33 to array 30. Following discharge from scan station 54, the document is inverted and returned to document tray 75 in the manner described above.

Where operation in the third or manual simplex mode is desired (MODE III), the document to be scanned is placed face down on platen 25. Controller 100 is set to the MODE III position. The control signal output of controller 100 to distributor line 122 actuate carriage drive motor 24 to move the carriage 32 at a predetermined scan rate past platen 25 and the document 27 thereon. The signal output of controller 100 also actuates clock 31 to drive scanning array 30 and energizes scan lamps 41 (through gates 110, 111, 115) to illuminate a line-like portion of the document on platen 25 as the scan carriage 32 passes therebelow.

Image rays from the document pass through scan slit 40 in carriage 32 to mirror 37, and from mirror 37 to mirrors 36, 35, and lens 33 to array 30.

While scanner 10 has been disclosed and described in connection with a raster scanning application employing one or more scanning arrays 30, it will be understood that scanner 10 may instead be used as a document exposure device in combination with a xerographic system to expose a photoconductive memeber. In that application, the image rays produced by scanner 10 would be transmitted via optical system 32 to the moving previously charged photoconductive memeber of the xerographic system to expose the photoconductive member and create latent electrostatic images of the document 27 being scanned thereon in a manner known to those skilled in the art.

While the invention has been described with reference to the structure disclosed, it is not confined to the details set forth but is intended to cover such modifications or changes as may come within the scope of the following claims.

I claim:

1. A document scanner comprising:
   (a) a document supply tray;
   (b) first and second scan stations;
   (c) means forming a path for conveying documents removed from said tray past said first and second scan stations in succession and back to said tray, said path including means to invert the document as the document is moving from said first scan station to said second scan station whereby one side of the document is scanned at said first scan station and the other side at said second scan station;
   (d) document transport means for transporting documents from said tray along said path past said first and second scan stations and back to said tray;
   (e) each of said first and second scan stations including a scanning slit through which the document moving along said path is viewed;
   (f) means for illuminating said scanning slits and the document portion thereover;
   (g) at least one scanning array; and
   (h) optical means for selectively transmitting images of the document portion viewed through said scanning slits of said first and second scan stations to said array whereby both sides of the document are scanned.

2. The scanner according to claim 1 including carriage means for supporting said optical means and said array;
   said carriage means including a first scanning slit optically communicating with the scanning slit for said first scan station and a second scanning slit optically communicating with the scanning slit for said second scan station;
   said optical means including a movable reflector effective when in a first position to complete an optical path between said array and said first scan station;
   said reflector when in a second position completing an optical path between said array and said second scan station.

3. The scanner according to claim 2 in which said second scan station illumination means is mounted on said carriage.

4. The scanner according to claim 3 including
   a transparent platen for supporting a document to be scanned;
   means supporting said carriage for scanning movement relative to said platen; and
   carriage drive means for effecting scanning movement of said carriage;
   said reflector in said second position enabling said array to scan a document on said platen on scanning movement of said carriage;

said document being illuminated by said second illumination means.

5. The scanner according to claim 1 in which the document path formed by said document path forming means comprises a loop leading from said tray underneath said tray and back to said tray.

6. The scanner according to claim 4 in which said transport means includes constant velocity transport means at each of said first and second scan stations.

7. A multi-mode raster scanner adapted in a first mode to scan one side of a moving document, in a second mode to scan the reverse side of a moving document, and in a third mode to scan one side of a stationary document, comprising:
   (a) a first scan station for said first mode;
   (b) a second scan station for said second mode;
   (c) a platen for supporting a document to be scanned in said third mode;
   (d) a document supply tray;
   (e) means forming a generally U-shaped document path for conducting a document to be scanned from said tray past said first and second scan stations and back to said tray, said document path including means to invert the document before the document reaches said second scan station;
   (f) document transport means for moving documents from said tray along said document path and back to said tray during said first and second modes;
   (g) said first and second scan station each including a scanning slit through which the document is scanned;
   (h) at least one scanning array;
   (i) optical means for transmitting document images from said first and second scan stations through the first and second scan station scanning slits to said array or from said platen to said array; and
   (j) carriage means supporting said array and said optical means for selective movement into scanning relation with said first and second scan stations in said first and second modes, or for scanning movement past said platen in said third mode.

8. The scanner according to claim 7 including
   (a) first illuminating means for illuminating said first scan station scanning slit;
   (b) second illuminating means for illuminating said second scan station scanning slit, said second illuminating means being supported on said carriage means whereby to illuminate said platen and the document thereon in said third mode.

9. The scanner according to claim 7 in which said optical means includes reflector means effective in one position to optically couple said first scan station with said array when in said first mode, and in a second position to optically couple said second scan station and said platen with said array when in said second and third modes.

* * * * *